L. F. MEUNIER.
Heaters and Filters.
No. 140,719.   Patented July 8, 1873.
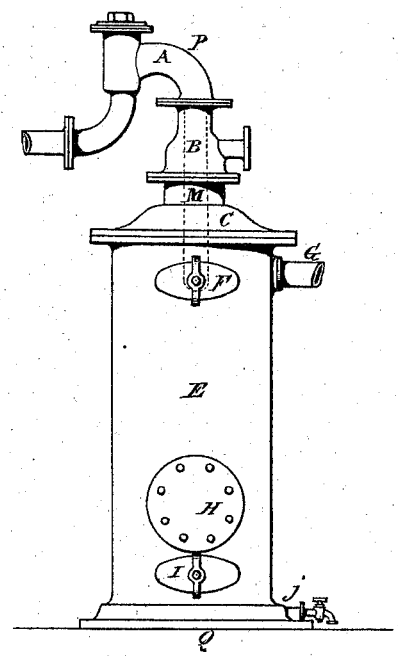
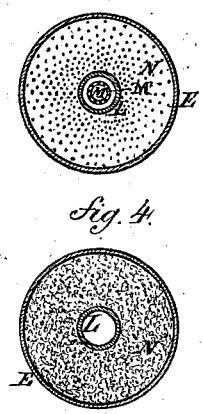
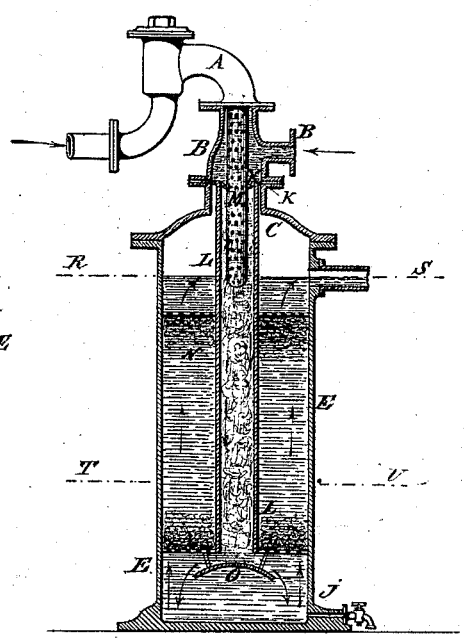

UNITED STATES PATENT OFFICE.

LOUIS FELIX MEUNIER, OF FIRES-LILLE, FRANCE.

IMPROVEMENT IN HEATERS AND FILTERS.

Specification forming part of Letters Patent No. 140,719, dated July 8, 1873; application filed January 9, 1873.

*To all whom it may concern:*

Be it known that I, LOUIS FELIX MEUNIER, at Fires-Lille, France, builder, have invented an Improvement in Heaters and Filters, of which the following is a specification:

This invention relates to apparatus for separating from the feed-water of steam-boilers the matters suspended therein, which usually form incrustations on the interior surface of the boiler.

By the use of the improved apparatus, which I will presently describe, I am enabled to effect in one and the same vessel the heating of the feed-water, and the precipitation and filtration from it of a large proportion of the solid matter dissolved or suspended in it before it is supplied to the boiler.

Figure 1 of the annexed drawing is a front elevation of the improved apparatus. Fig. 2 is a vertical section of the same by the line P Q of the Fig. 1. Figs. 3 and 4 are respectively transversal sections by the lines R S and T U of the Fig. 2.

For this purpose I provide a purifying-vessel, E, which may conveniently be of cylindrical form placed upright. The feed-water from the feed-pump, or from a cistern giving sufficient pressure for feeding the boiler, is admitted to the upper end B of a vertical tube, L, which descends toward the bottom of this vessel, the water being made to pass through a sieve, K, of the shutter C, and down the tube. Within the tube L is another perforated tube, A M, communicating with the steam-space of the boiler, and a little below the lower end of the first-mentioned tube L is fixed a convex disk, O, plate, or spreader, on which the water descending by the tube L, and heated by its contact with the steam escaping from the perforations of the inner tube M, deposits a portion of its impurities. In the middle part of the vessel, between two perforated plates, N N, and surrounding the descending-tube L, are placed filtering materials, such as cinders, charcoal, fragments of wood, and the like, through which the water rises from the bottom of the vessel. Above the filter is a pipe, G, through which the purified water flows to the boiler. The purifying-vessel is provided with a stop-cock, J, at bottom, by which it can be emptied of water, and its upper and lower compartments, as well as the middle compartment containing the filtering materials, have man-holes or hand-holes F, H, and I, by which access is given for cleansing or changing the filter.

Having thus described my improved apparatus for purifying feed-water of steam-boilers, I claim—

The vessel E, provided with a central vertical tube, L, and with perforated partitions N N around the said tube, the disk or spreader O at the bottom of the said tube, the inlet B, and the perforated steam-tube M within the said vertical tube L, to discharge steam into the water flowing into the said tube L, and the said vessel further provided with the outlet G, all constructed and operated substantially in the manner and for the purpose specified.

In testimony whereof I have signed my name to this specification before two subscribing witnesses.

L. F. MEUNIER.

Witnesses:
   ED. FERN DE WICKE,
   T. DEBLON.